(12) United States Patent
Liang et al.

(10) Patent No.: US 12,103,460 B2
(45) Date of Patent: Oct. 1, 2024

(54) VEHICLE STEERING WHEEL WITH RADIAL LIGHT-EMITTING REGION

(71) Applicant: Autoliv Development AB, Vargarda (SE)

(72) Inventors: Mingfei Liang, Shanghai (CN); Linlin Xu, Shanghai (CN); Fenxia Zhang, Shanghai (CN); Ruigang Sang, Shanghai (CN)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 18/556,550

(22) PCT Filed: Mar. 8, 2022

(86) PCT No.: PCT/CN2022/079718
§ 371 (c)(1),
(2) Date: Oct. 20, 2023

(87) PCT Pub. No.: WO2022/227867
PCT Pub. Date: Nov. 3, 2022

(65) Prior Publication Data
US 2024/0198898 A1     Jun. 20, 2024

(30) Foreign Application Priority Data

Apr. 30, 2021    (CN) .......................... 202120933410.7

(51) Int. Cl.
*B60Q 3/283*    (2017.01)
*B62D 1/06*    (2006.01)

(52) U.S. Cl.
CPC ............... *B60Q 3/283* (2017.02); *B62D 1/06* (2013.01)

(58) Field of Classification Search
CPC ...................................................... B60Q 3/283
See application file for complete search history.

(56) References Cited

U.S. PATENT DOCUMENTS

2019/0275935 A1    9/2019  Lisseman et al.

FOREIGN PATENT DOCUMENTS

| CN | 101670847 A | 3/2010 |
|----|-------------|--------|
| CN | 204879711 U | 12/2015 |
| CN | 207676355 U | 7/2018 |
| CN | 110792984 A | 2/2020 |

*Primary Examiner* — Joseph L Williams
(74) *Attorney, Agent, or Firm* — Matthew D. Thayne; Thayne and Davis LLC

(57) ABSTRACT

A steering wheel, including a steering wheel rim and a light-emitting assembly arranged on the steering wheel rim, wherein the light-emitting assembly includes a light source, a light guide member, and a light transmissive member, the light guide member including a light inlet portion, a light outlet portion, and an orientation portion provided between the light inlet portion and the light outlet portion. Light emitted by the light source enters the light inlet portion in a first direction, is oriented by the orientation portion, and then exits the steering wheel from the light outlet portion and the light transmissive member sequentially in a second direction. The first direction is different from the second direction, and the light transmissive member is configured to be annular and arranged in a radial direction of the steering wheel.

10 Claims, 3 Drawing Sheets

VEHICLE STEERING WHEEL WITH RADIAL LIGHT-EMITTING REGION

TECHNICAL FIELD

The present invention relates to automobile parts, in particular to a steering wheel.

BACKGROUND

Steering wheels of some automobiles can emit light. Steering wheel rims of these steering wheels are illuminated when light-emitting members emit light, so that light is emitted at the wheel rims of the steering wheels. The steering wheel is provided with the light-emitting steering wheel rim, so that in one aspect, a decorative effect is achieved, and the steering wheel is more aesthetically pleasing. In another aspect, when lighting is poor (e.g., at night), the light-emitting steering wheel rim can provide an illumination function.

However, due to limited mounting space that can be provided by the steering wheel rim, the light-emitting member is typically arranged in a circumferential direction of the steering wheel, resulting in limitations on the arrangement of a light-emitting region on the steering wheel rim.

SUMMARY

An objective of the present invention is to provide a steering wheel having a specific arrangement of a light-emitting region. Specifically, the specific arrangement of a light-emitting region is arranged in a radial direction of the steering wheel.

Provided in the present invention is a steering wheel, comprising a steering wheel rim and a light-emitting assembly arranged on the steering wheel rim,
wherein,
the light-emitting assembly comprises a light source, a light guide member, and a light transmissive member,
the light guide member comprising a light inlet portion, a light outlet portion, and an orientation portion provided between the light inlet portion and the light outlet portion, and light emitted by the light source entering the light inlet portion in a first direction, being oriented by the orientation portion, and then exiting the steering wheel from the light outlet portion and the light transmissive member sequentially in a second direction,
wherein the first direction is different from the second direction, and the light transmissive member is configured to be annular and arranged in the radial direction of the steering wheel.

According to an embodiment of the present invention, the orientation portion comprises a plurality of orientation sub-portions used to orient, a plurality of times, the light emitted by the light source so that the light emitted by the light source changes from propagating in the first direction to propagating in the second direction.

According to an embodiment of the present invention, the orientation sub-portions are configured to be flat surfaces.

According to an embodiment of the present invention, the light-emitting assembly comprises a printed circuit board comprising a first rigid printed circuit board and a second flexible printed circuit board electrically connected to each other, a control element used to control the light source being provided on the first rigid printed circuit board, and the light source being provided on the second flexible printed circuit board.

According to an embodiment of the present invention, the steering wheel further comprises a mounting plate provided with a first mounting portion, a second mounting portion, and a third mounting portion used to mount the first rigid printed circuit board, the second flexible circuit board, and the light guide member, one or a plurality of the first mounting portion, the second mounting portion, and the third mounting portion being configured to be protruding portions having hook-like ends.

According to an embodiment of the present invention, the light transmissive member comprises two end walls and a side wall connected to the end walls, each end wall being configured to be a lightproof wall, and the side wall being configured to be a light transmissive wall.

According to an embodiment of the present invention, the light transmissive member is held firmly between two housings of the steering wheel rim.

According to an embodiment of the present invention, the steering wheel further comprises a foam body used to mount the housings, the mounting plate being fixed on the foam body.

According to an embodiment of the present invention, a sheath is further provided, and the sheath is provided on the part of the steering wheel rim excluding the light transmissive member.

According to an embodiment of the present invention, the second direction is defined as the radial direction of the steering wheel rim, and the first direction is perpendicular to the second direction.

BRIEF DESCRIPTION OF THE DRAWINGS

The features, advantages, and technical effects of exemplary embodiments of the present invention will be described below with reference to the accompanying drawings. In the accompanying drawings, the same reference numbers denote the same elements, where FIG. 1 schematically illustrates a steering wheel according to an embodiment of the present invention.

DETAILED DESCRIPTION

Figure 1:
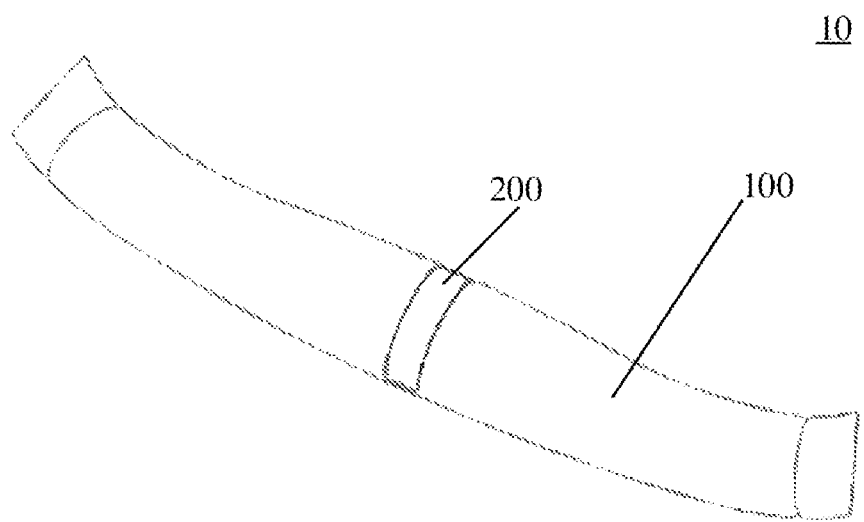

Specific embodiments of a steering wheel according to the present invention will be described below with reference to the accompanying drawings. The following detailed description and the accompanying drawings are used to illustratively explain the principles of the present invention. The present invention is not limited to the described preferred embodiments, and various embodiments described in the present invention can be used individually or in any combination. The scope of protection of the present invention is defined by the claims.

In addition, terms for spatial relations (such as "upper", "lower", "left", "right", etc.) are used to describe a relative positional relationship between an element and another element shown in the accompanying drawings. Therefore, when used, the terms for spatial relations may be applied to directions different from those shown in the accompanying drawings. Obviously, although all of these terms for spatial relations refer to the directions shown in the accompanying drawings for ease of explanation, a person skilled in the art will appreciate that directions different from those shown in the drawings may be used.

FIG. 1 schematically illustrates a steering wheel according to an embodiment of the present invention. The steering wheel according to the embodiment of the present invention is described below with reference to FIG. 1.

As shown in FIG. 1, a steering wheel 10 according to an embodiment of the present invention includes a steering wheel rim 100 (only a portion of the steering wheel rim 100 is shown in FIG. 1 rather than the entirety) and a light-emitting assembly 200 arranged on the steering wheel rim 100. In the present invention, a light-emitting region is arranged in a radial direction of the steering wheel 100. A detailed description is provided below.

Figure 2:
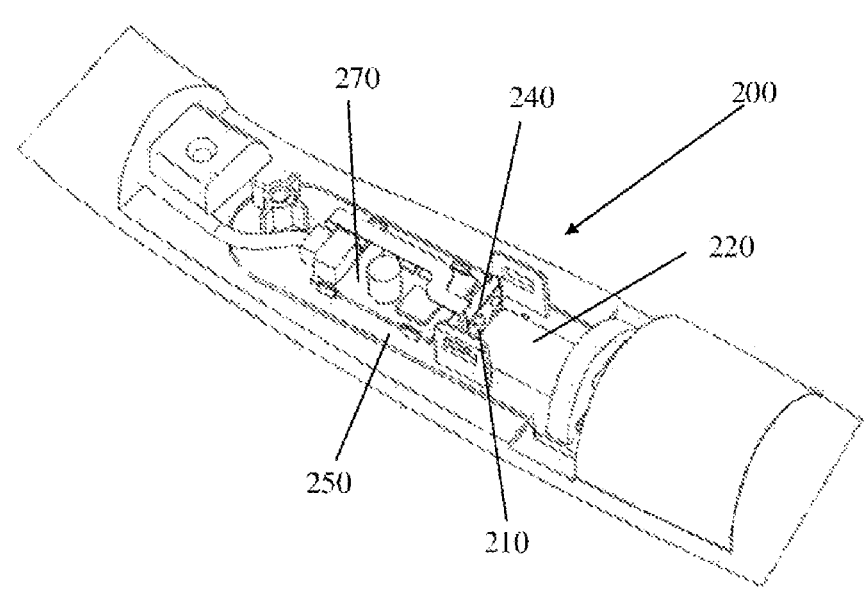
FIG. 2 schematically illustrates a light-emitting assembly in a steering wheel according to an embodiment of the present invention.
Figure 3:
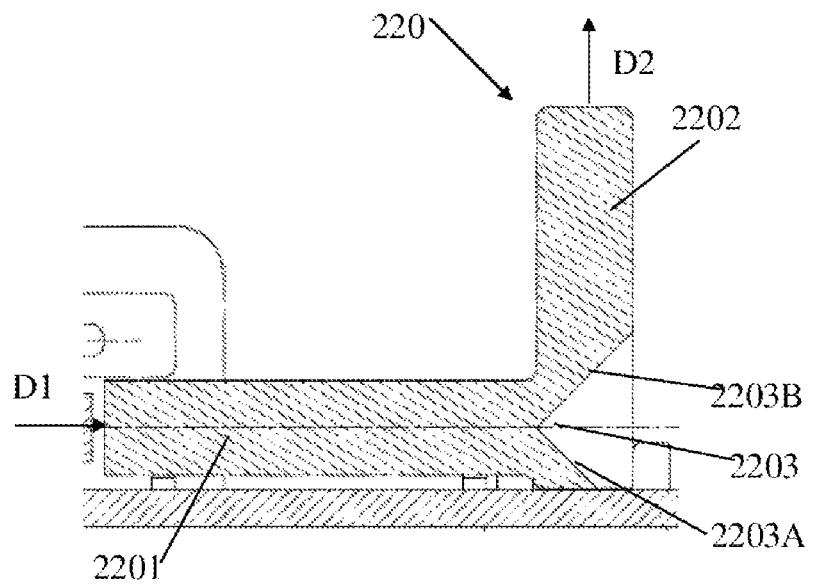
FIG. 3 schematically illustrates some components of a light-emitting assembly in a steering wheel according to an embodiment of the present invention.

FIG. 2 schematically illustrates a light-emitting assembly in a steering wheel according to an embodiment of the present invention. FIG. 3 schematically illustrates some components of a light-emitting assembly in a steering wheel according to an embodiment of the present invention. The light-emitting assembly in the steering wheel according to the embodiment of the present invention is described below with reference to FIG. 2 and FIG. 3.

As shown in FIG. 2, the light-emitting assembly 200 according to the embodiment of the present invention includes a light source 210, a light guide member 220, a first rigid printed circuit board 270, and a second flexible circuit board 240. Specifically, the first rigid printed circuit board 270 and the second flexible printed circuit board 240 are electrically connected to each other. A control element used to control the light source 210 is provided on the first rigid printed circuit board 270, and the light source 210 is provided on the second flexible printed circuit board 240. As can be clearly seen from FIG. 2, the first rigid printed circuit board 270 and the second flexible printed circuit board 240 are perpendicular to each other, thereby advantageously reducing the mounting space required by the light-emitting assembly 200. In the embodiment shown in FIG. 2, the number of light sources 210 is set to two, and the light sources 210 are obscured by the light guide member 220, so that the light sources 210 cannot be wholly seen.

Figure 5A:
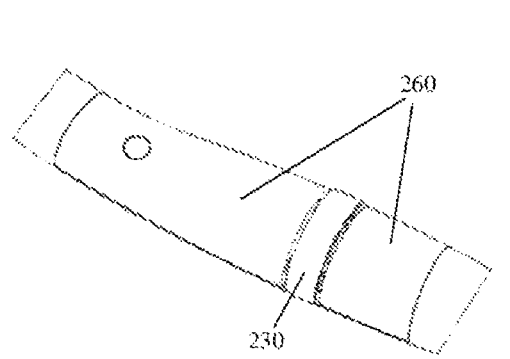
FIG. 5(a) and FIG. 5(b) each schematically illustrate some components of a light-emitting assembly in a steering wheel according to an embodiment of the present invention.

In addition, the light-emitting assembly 200 further includes a light transmissive member 230. As shown in FIG. 5(a), light emitted by the light source 210 passes through the light guide member 220, and then passes through the light transmissive member 230, so that light is emitted at the light transmissive member 230 of the steering wheel 100. In other words, the light transmissive member 230 is the light-emitting region of the steering wheel 100. In addition, as shown in FIG. 5(a), the light transmissive member 230 is configured to be annular and arranged in the radial direction of the steering wheel 100.

It should be noted that the light-emitting assembly in the steering wheel according to the present invention is not limited to including both the first rigid printed circuit board and the second flexible printed circuit board. For example, the light-emitting assembly may include only a rigid printed circuit board. In this case, the light source and the control element used to control the light source are both mounted on the rigid printed circuit board, and the light source is configured to be a side-emitting light source so that light emitted by the light source propagates in a first direction.

The above-described light guide member 220 is described in the following with reference to FIG. 3. As shown in FIG. 3, the light guide member 220 includes a light inlet portion 2201, a light outlet portion 2202, and an orientation portion 2203 provided between the light inlet portion and the light outlet portion. Light emitted by the light source 210 enters the light inlet portion 2201 in the first direction D1, is oriented by the orientation portion 2203, and then exits the steering wheel 10 from the light outlet portion 2202 and the light transmissive member 230 sequentially in a second direction D2 (described in detail below).

As an example of the present invention, as shown in FIG. 3, the orientation portion 2203 includes a flat surface 2203A and a flat surface 2203B serving as orientation sub-portions so as to orient twice the light emitted by the light source 210 so that the light emitted by the light source 210 changes from propagating in the first direction D1 to propagating in the second direction D2. It can be understood that the above is merely an example, and the guide member of the present invention is not limited thereto. Those skilled in the art can analyze and determine the structure of the orientation portion in the guide member by means of optical simulation according to actual circumstances, e.g., the number of orientation sub-portions of the orientation portion, the direction, the type of the surface forming the orientation sub-portions, etc. As an alternative example, the orientation portion may also be configured to be conical. In other words, several tiny flat surfaces are connected to each other to form the conical orientation portion. As another alternative example, the orientation portion may also be configured to cause, by means of only one orientation, the light emitted by the light source to change from propagating in the first direction to propagating in the second direction, and in this case, the orientation portion may be configured to be one flat surface.

In addition, as can be clearly seen from FIG. 3, the first direction D1 is different from the second direction D2. Particularly, in the embodiment shown in FIG. 3, the first direction D1 is perpendicular to the second direction D2. However, this is merely an example. The first direction and the second direction are not limited to being perpendicular to each other, but may be configured to form another angle therebetween, e.g., any acute angle.

Figure 4:
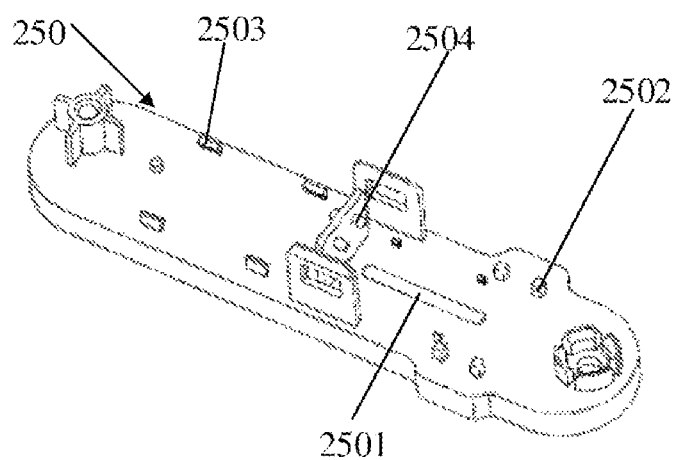
FIG. 4 schematically illustrates some components of a light-emitting assembly in a steering wheel according to an embodiment of the present invention.

FIG. 4 schematically illustrates some components of a light-emitting assembly in a steering wheel according to an embodiment of the present invention. Description of the light-emitting assembly in the steering wheel according to the embodiment of the present invention is continued below with reference to FIG. 4.

As shown in FIG. 4, as an example of the present invention, the steering wheel 100 further includes a mounting plate 250. The mounting plate 250 is provided with a first mounting portion 2503 used to mount the first rigid printed circuit board 270, a second mounting portion 2504 used to mount the second flexible circuit board 240, and a third mounting portion 2502 used to mount the light guide member 220, and, among the first mounting portion 2503, the second mounting portion 2504, and the third mounting portion 2502, the first mounting portion 2503 and the third mounting portion 2502 are configured to be protruding portions having hook-like ends. The hook-like ends of the protruding portions can fasten, firmly on the mounting plate 230, a member to be mounted, so that the member to be mounted and the mounting plate 230 are fixedly connected to each other. The second mounting portion 2504 is configured to be a protruding column and a flat mounting surface. The protruding column serves as a positioning portion, and the flat mounting surface is covered by an adhesive. The second flexible circuit board 240 is first positioned in a predetermined position on the flat mounting surface by means of the protruding column, and then bonded to the flat mounting surface by means of the adhesive so that the second flexible circuit board 240 and the mounting plate 250 are fixedly connected to each other. It should be noted that the flat mounting surface of the second mounting portion 2504 is configured to be perpendicular to a flat mounting surface where the first rigid printed circuit board 270 is located. The two flat mounting surfaces are configured to be perpendicular to each other so that the first rigid printed circuit board 270 and the second flexible printed circuit board 240 are perpendicular to each other after mounting is completed. However, this is merely an example, and the mounting plate of the present invention is not limited to the above-described mounting structure. For example, all of the above-described mounting portions may be configured to be protruding portions having hook-like ends, or the above-described mounting portions may be replaced with other fixing members, such as bolts, to achieve fixed connection.

As an example of the present invention, a positioning protrusion 2501 is further provided on the mounting plate 230, and is used to quickly position the light guide member 220 in a predetermined position on the mounting plate 230, thereby facilitating subsequent mounting and fixing.

Figure 5B:
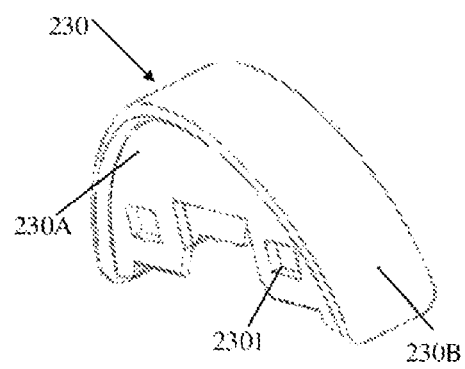

FIG. 5(*a*) and FIG. 5(*b*) each schematically illustrate some components of a light-emitting assembly in a steering wheel according to an embodiment of the present invention. The light-emitting assembly in the steering wheel according to the embodiment of the present invention is further described below with reference to FIG. 5(*a*) and FIG. 5(*b*), respectively.

As shown in FIG. 5(*a*), as an example of the present invention, the steering wheel 260 further includes a housing 260 used to at least partially accommodate the light-emitting assembly 200. In addition, the housing 260 is mounted on a foam body (not shown) (for example, by means of a fastener), and the mounting plate 250 is fixed on the foam body (for example, by means of a fastener). It should be noted that in the embodiments described in accordance with the accompanying drawings, the light transmissive member 230 and the housing 260 are both approximately in the shape of a semicircle. However, this is merely an example. The light transmissive member and the housing may be configured to be in the shape of a full circle and on the steering wheel according to requirements.

As shown in FIG. 5(*b*), as an example of the present invention, the light transmissive member 230 includes two end walls 230A and a side wall 230B connected to the end walls 230A. Each end wall 230A is configured to be a lightproof wall, and the side wall 230A is configured to be a light transmissive wall. The above-described light transmissive member 230 may be manufactured by means of a double-color injection molding process. In addition, each end wall 230A of the light transmissive member 230 is provided with a recessed portion 2301. Correspondingly, the housing 260 is provided with a protrusion (not shown) for extending to enter the recessed portion 2301. The protrusion extends to enter the recessed portion 2301 so as to hold the light transmissive member 230 firmly between two housings 260 of the steering wheel rim 200. It can be understood that the light transmissive member 230 in the present example has the advantages of leaking no light on the two sides and allowing light to be emitted at only the curved side wall, and can be fixed quickly and easily on the housings 260.

As an example of the present invention, the steering wheel rim 200 is further covered by a sheath. The sheath is provided on the part of the steering wheel rim 200 excluding the light transmissive member 230, so as to provide improved integrality for the steering wheel rim.

When the steering wheel according to the present invention is mounted, mounting steps include:

step 1: providing the mounting plate 250;

step 2: mounting the first rigid printed circuit board 270 on the mounting plate 250 by means of the first mounting portion 2503, and positioning the second flexible printed circuit board 240 on the mounting plate 250 first by means of the protruding column in the second mounting portion 2504, and then bonding the positioned second flexible printed circuit board 240 on the flat mounting surface of the second mounting portion 2504;

step 3: mounting one side of one housing 260 on the mounting plate 250, and then mounting the other side of the housing 260 on the foam body;

step 4: positioning the light guide member 220 on the mounting plate 250 by means of the positioning protrusion 2501, and the fixing the light guide member 220 to the mounting plate 250 by means of the third mounting portion 2502;

step 5: mounting one side of the other housing 260 on the mounting plate 250, and then mounting the other side of the housing 260 on the foam body;

step 6: mounting the light transmissive member 230 between the two housings 260 by causing the protrusions of the two housings 260 to extend into the recessed portions 2301 of the light transmissive member 230; and step 7: performing wrapping by using the sheath.

As described above, although the exemplary embodiments of the present invention have been described with reference to the accompanying drawings in the description, the present invention is not limited to the aforementioned specific embodiments, and the scope of protection of the present invention should be defined by the claims and equivalent meanings thereof.

The invention claimed is:

1. A steering wheel, comprising a steering wheel rim and a light-emitting assembly arranged on the steering wheel rim, wherein the light-emitting assembly comprises a light source, a light guide member, and a light transmissive member, the light guide member comprising a light inlet portion, a light outlet portion, and an orientation portion provided between the light inlet portion and the light outlet portion, and light emitted by the light source entering the light inlet portion in a first direction, being oriented by the orientation portion, and then exiting the steering wheel from the light outlet portion and the light transmissive member sequentially in a second direction, wherein, the first direction is different from the second direction, and the light transmissive member is configured to be annular and arranged in a radial direction of the steering wheel.

2. The steering wheel according to claim 1, wherein, the orientation portion comprises a plurality of orientation sub-portions used to orient, a plurality of times, the light emitted by the light source so that the light emitted by the light source changes from propagating in the first direction to propagating in the second direction.

3. The steering wheel according to claim 2, wherein, the orientation sub-portions are configured to be flat surfaces.

4. The steering wheel according to claim 1, wherein, the light-emitting assembly comprises a printed circuit board comprising a first rigid printed circuit board and a second flexible printed circuit board electrically connected to each other, a control element used to control the light source being provided on the first rigid printed circuit board, and the light source being provided on the second flexible printed circuit board.

5. The steering wheel according to claim 4, further comprising a mounting plate provided with a first mounting portion, a second mounting portion, and a third mounting portion used to mount the first rigid printed circuit board, the second flexible circuit board, and the light guide member, one or a plurality of the first mounting portion, the second mounting portion, and the third mounting portion being configured to be protruding portions having hook-like ends.

6. The steering wheel according to claim 5, wherein, the light transmissive member comprises two end walls and a side wall connected to the end walls, each end wall being configured to be a lightproof wall, and the side wall being configured to be a light transmissive wall.

7. The steering wheel according to claim 6, wherein, the light transmissive member of the steering wheel is held firmly between two housings of the steering wheel rim.

8. The steering wheel according to claim 7, further comprising a foam body used to mount the housings, the mounting plate being fixed on the foam body.

9. The steering wheel according to claim 8, wherein, a sheath is further provided, and the sheath is provided on the part of the steering wheel rim excluding the light transmissive member.

10. The steering wheel according to claim 1, wherein, the second direction is defined as the radial direction of the steering wheel rim, and the first direction is perpendicular to the second direction.

* * * * *